WILLIAM H. HOLLAND.
Improvement in Pistons.
No. 121,103.          Patented Nov. 21, 1871.
Fig. 1
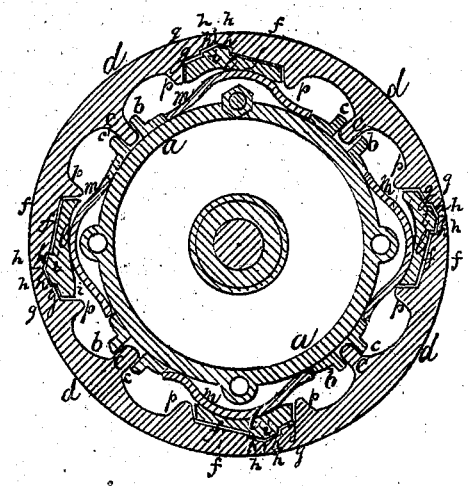
Fig. 2.
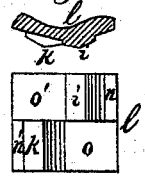
Fig. 3.
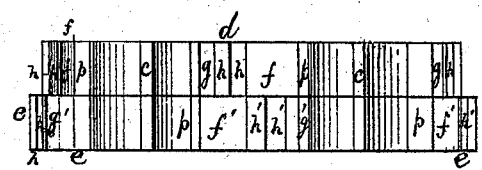
Fig. 4.
Witnesses
Saml. M. Barton
Nath. Brown jr
Inventor
Wm. H. Holland
by his Atty.
Carroll D. Wright No. 121,103

UNITED STATES PATENT OFFICE.

WILLIAM H. HOLLAND, OF BOSTON, MASSACHUSETTS.

IMPROVEMENT IN PISTONS.

Specification forming part of Letters Patent No. 121,103, dated November 21, 1871.

*To all whom it may concern:*

Be it known that I, WILLIAM H. HOLLAND, of Boston, in the county of Suffolk and State of Massachusetts, have invented certain Improvements in Pistons, of which the following is a specification:

In the accompanying drawing, Figure 1 is a horizontal section of a piston, showing my improved packing. Fig. 2 is a section taken horizontally through the top, and Fig. 3 is the front view of a part of my improvement. Fig. 4 is an interior view of one-half of another portion of my improvement.

The present invention relates to certain new and useful improvements in pistons, the general principles of which are embodied in the patent allowed me September 26, 1871; and consist in so arranging segments, formed as hereinafter described, in connection with angular recesses formed on the ends of each portion of rings connected with a piston, as to form, when operated by a spring, a more secure protection against leakage at the joints, and to allow of the expansion and contraction and the wear of the several parts of the piston, &c., without detriment to the effective operation of the packing.

In the drawing, $a\ a$ is a piston, provided with boxes $b\ b\ b\ b$, which receive tongues $c\ c\ c\ c$ formed on the inner periphery of rings $d\ d\ d\ d$ and $e\ e\ e$, which are formed in segments, each end of which is arranged with beveled recesses $f\ f\ f'\ f'\ g\ g\ g'\ g'\ h\ h\ h'\ h'$, forming rabbets, against which impinge the sides of triangular or wedge-shaped projections $i$ and $k$, which are permanently formed on the face of a beveled segment, $l$, hollowed at the back to receive a double-curved Z or other suitable spring, $m$. The projections $i\ k$ are arranged alternately on the face of the beveled segment $l$, as shown in Figs. 2 and 3, with the projection $i$ at the top and $k$ at the bottom, forming a narrow beveled space, $n$, on one side of the projection $i$, and a wider beveled space, $o$, below the projection $i$, which has a wide beveled space, $o'$, on its opposite side, and a narrower beveled space, $n'$, below it. The rings $d\ d\ e\ e$ are formed with flanges $p\ p\ p\ p\ p\ p\ p\ p$, against which abut the ends of the beveled segment $l$. The rings $d\ d$ and $e\ e$ are placed one above the other, so as to break joints and to form beveled recesses corresponding to and receiving the projections $i\ k$ and beveled projections $f\ f'\ g\ g'$, which fit into the beveled spaces $n\ n'\ o\ o'$ of the beveled segment $l$, which is, by the operation of the spring $m$ at its back, pressed and held firmly against the recesses $f\ g\ h$, the series of rabbets formed by the projections $i\ k$ and recesses $f\ f'\ g\ g'\ h\ h'$ making the joints perfectly secure from any leakage; for if the steam, &c., should possibly escape through one joint, which the wedge-shaped arrangement of the projections $i\ k$ is designed to prevent, it will be stopped by the rabbets formed on the rings $d\ d\ e\ e$ and the projections $f\ f'\ g\ g'\ h\ h'$, which are made to press firmly against each other by means of the action of the spring $m$ against the back of the beveled segment $l$, which, in case of the expansion or contraction or the wear of the metal or other material of which the piston and rings are composed, adjusts itself so as to bear with equal effect against the beveled segment $l$, so that under all circumstances the projections $i\ k$ are firmly pressed and held against the beveled recesses, and the rabbets of the several projections and recesses are brought to impinge tightly against each other, thus preventing any leakage of the steam, &c., the leakage through one joint being prevented by the obstruction formed at the next, as will readily be seen.

Having thus fully described my improvements, what I claim as my invention, and desire to have secured to me by Letters Patent, is—

1. The beveled segment $l$, formed with a curved back and permanent alternate triangular projections $i\ k$ on the face, in combination with the rings $d\ d\ e\ e$, spring $m$, and piston $a$, substantially as specified.

2. The spring $m$, in combination with the beveled segment $l$, rings $d\ d\ e\ e$, and piston $a$, substantially as specified.

3. The rings $d\ d\ e\ e$ arranged with beveled recesses $f\ f'\ g\ h\ h'$, tongues $c\ c\ c\ c$, and flanges $p\ p\ p\ p$, &c., in combination with beveled segment $l$, spring $m$, and piston $a$, substantially as specified.

4. The combination of the piston $a$, formed with the boxes $b\ b\ b\ b$, with the spring $m$, rings $d\ d\ e\ e$, and beveled segments $l\ l\ l\ l$, substantially as specified.

In testimony whereof I have signed my name to this specification in the presence of two subscribing witnesses.

WM. H. HOLLAND.

Witnesses:
SAML. M. BARTON,
CARROLL D. WRIGHT.

(151)